Jan. 3, 1950 W. E. O'SHEI 2,493,688
VEHICLE DIRECTION INDICATOR
Filed June 3, 1947 2 Sheets-Sheet 1

Inventor
William Edward O'Shei
By Emery, Holcombe Blair
Attorney

Jan. 3, 1950 W. E. O'SHEI 2,493,688
VEHICLE DIRECTION INDICATOR
Filed June 3, 1947 2 Sheets-Sheet 2

Inventor
William Edward O'Shei
By Emery, Holcombe & Blair
Attorney

Patented Jan. 3, 1950

2,493,688

UNITED STATES PATENT OFFICE 2,493,688

VEHICLE DIRECTION INDICATOR

William Edward O'Shei, London, England

Application June 3, 1947, Serial No. 752,192
In Great Britain June 6, 1946

8 Claims. (Cl. 177—329)

The present invention relates to vehicle direction indicators and more particularly to indicators of the semaphore arm type.

It is known to construct the arms of such indicators as a hollow moulding of translucent plastic material within which the illuminating lamp for the arm is disposed, the open edge of the moulding being closed by a metal cover plate fitting thereover. Hitherto such moulded arms have been moulded from a hard variety of a synthetic resin plastic, such as that known under the registered trade mark "Bakelite," as a result of which the arm is substantially rigid. Due to the hardness and rigidity of the plastic used, the arms often become cracked and broken due either to overheating from the illuminating lamp or when the arm becomes accidentally knocked or bent.

The present invention consists, from one aspect, in an improved moulded arm for direction indicators, which is moulded of a flexible plastic material having such elastic properties that cracking due to the above-mentioned facts is not possible, or is reduced to a minimum. Due to the flexible nature of the material, of which polythene may be mentioned as an example, a hollow moulded arm produced therefrom is extremely flexible and liable to become bent out of its straight form under the action of the wind pressures thereon where the arm is extended from a vehicle travelling at high speed, or upon being accidentally knocked, as a result of which the arm might not fit back into the casing or opening into which it is intended to fit when the arm is lowered.

A further object of the invention, therefore, is to provide a vehicle direction indicator arm constructed from a flexible material of the kind above referred to, which is so reinforced that it can maintain a substantially straight form under normal conditions of use.

To this end, according to another aspect of the invention, the arm is constructed as a single moulding of a flexible material of the type referred to with a recess along at least one edge thereof, into which is fitted a reinforcing member which is substantially rigid, at least in a direction at right angles to the plane of the arm, so as to prevent the arm from being bent out of its straight form and fouling the casing or opening into which it fits when the arm is lowered.

The reinforcing member may be made of metal, for example either as a die casting or a channel-shaped metal stamping. The inner surfaces of the sides of the arm moulding may be provided with beads or the reinforcing member may be provided with flanges to limit the distance by which it extends into the recess.

The moulded arm may be made hollow so as to accommodate an illuminating bulb or bulbs and also for reducing the wall thickness of the moulding. The moulding is preferably open along the upper edge of the arm into which the reinforcing member is fitted.

The reinforcing member may simply fit into the open edge of the arm and be held therein by a cover plate or trimmer plate extending over the open edge of the arm, and preferably of channel form, to embrace the outer surfaces of the side walls of the arm.

Alternatively, the reinforcing member may be secured to the moulding, for example by passing screws, rivets or other means through the moulding and the reinforcing member projecting thereinto. In the case where the reinforcing member is made of channel-shaped metal, the free edges of the channel member may be bent outwardly and clamped or crimped over the edges of the sides of the arm. In another embodiment, the reinforcing member may be made of a plastic material, for example of the same flexible plastic material as that of which the arm is made, which is secured by sticking, welding or in any other convenient manner between the inner surfaces of the hollow arm and adjacent the free edges thereof. In constructions in which the reinforcing member is secured within the recess, the reinforced edge of the arm may be enclosed by a cover plate or trimmer plate of metal or plastic.

The invention will be more clearly understood with reference to the embodiments shown in the accompanying drawings, in which.

Figure 1:
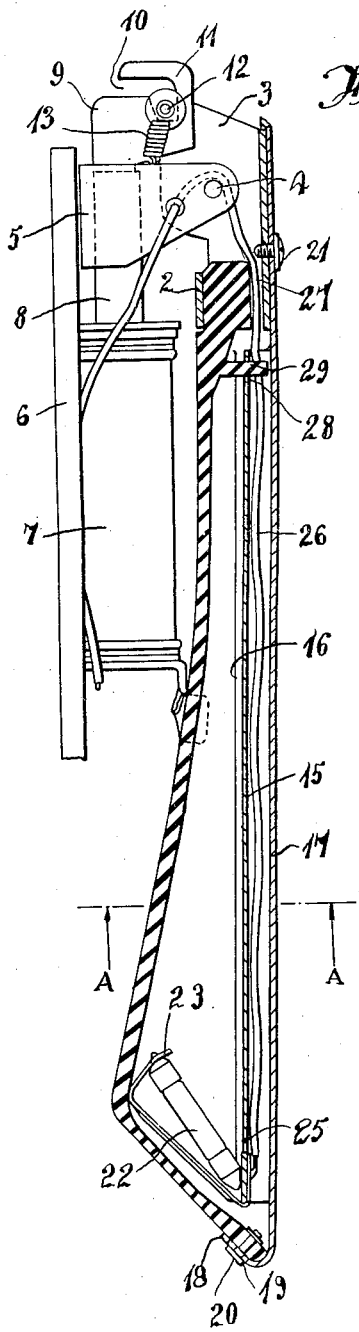
Figure 1 shows a side elevation, partly in section, of a vehicle direction indicator embodying a moulded arm according to this invention.

The vehicle direction indicator illustrated in Figure 1 comprises the indicating arm 1 made of a moulding of translucent plastic material, the inner end of which fits into a socket 2 formed in a metal bearing plate 3 pivoted on a spindle 4 extending between the limbs of a U-shaped bracket 5 carried by the back plate 6 of the indicator. The back plate 6 also carries the solenoid coil 7, the armature 8 of which carries a plate member 9 at its upper end, which plate member is formed with an L-shaped slot 10 within which is adapted to move a roller 11 carried on a pin 12 secured to the bearing plate 3. A coil spring 13 connects the pin 12 to a fixed point on the top plate 9. When the coil 7 is energized, the armature 8 is attracted downwardly. The initial movement of the armature extends the spring 13 to move the roller 11 to the horizontal portion of the slot 10, further downward moving of the armature causing the arm to pivot and swing to a horizontal indicating position. When the coil 7 is deenergized, the arm falls by gravity to raise the armature, the spring 13 giving the armature a final upward movement to locate the roller 12 in the vertical section of the slot 10 and lock the arm in the non-displayed position.

According to the present invention, the arm 1 is made of a single moulding of polythene or like flexible plastic material of hollow form, the arm being open along its upper edge (when the arm is in its horizontal displayed position). To prevent the arm from being bent out of its straight form under normal conditions of use, a reinforcing member 15 made of sheet metal of channel-shaped cross-section is fitted into the open edge of the arm. Longitudinal beads 16 are formed along the inner surfaces of the side walls of the arm moulding to limit the distance by which the reinforcing member 15 may be inserted into the arm. The open edge is finally covered by a trimmer plate 17, preferably made of metal, having flanges along its edge which fit over the outer surfaces of the side walls of the arm and retain them in contact with the reinforcing member. With this construction the free edges of the side walls of the arm are prevented from flexing either inwardly or outwardly. The outer end 18 of the trimmer plate 17 is bent over the end of the arm and is provided with an aperture 19 adapted to fit over the undercut head of a pin 20 secured to the outer end of the arm 1. The inner end of the trimmer plate 17 is secured to the bearing bracket 3 by means of the screw 21. When fitted in position, the trimmer plate 17 engages with the upper edges of the sides of the reinforcing member 15 to hold it in position in the arm and make electrical contact therewith.

The reinforcing member 15 extends along substantially the entire length of the open edge of the moulded arm and carries at its outer end an electric lamp 22 of the festoon type. One contact for the lamp is constituted by the strip 23 of springy metal, the opposite end of which is secured, with the interposition of insulating material 24, to the outer end of the reinforcing member 15. This strip 23 may be secured to the end of the reinforcing member by bending the extreme end of the strip through an aperture 25 in the base portion of the reinforcing member 15. Electric connection is made to the strip 23 by means of the wire 26 which passes along the channel of the reinforcing member and out through a passage 27 formed in the solid end of the arm which fits into the socket 2.

The other terminal of the festoon lamp 22 engages with the underside of the reinforcing member 15, the upper edges of which are in engagement with the underside of the trimmer plate 17, which is connected through the screw 21 and the frame of the indicator to ground.

The inner end of the reinforcing member 15 may be provided with an aperture 28 adapted to fit over a spigot 29 formed within the hollow cavity of the moulded arm 1 to locate the inner end of the reinforcing member and prevent longitudinal movement thereof within the moulded arm.

Figure 2:
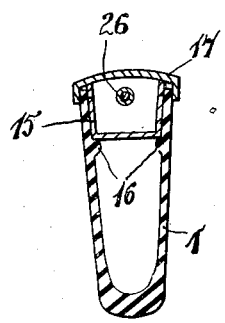
Figure 2 shows a section along the line A—A of Figure 1.
Figure 3:
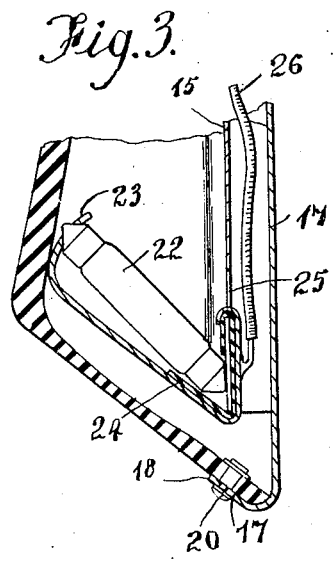
Figure 3 shows an enlarged view of the end of the arm shown in Figure 1 and the arrangement for supporting the illuminating lamp.
Figure 4:
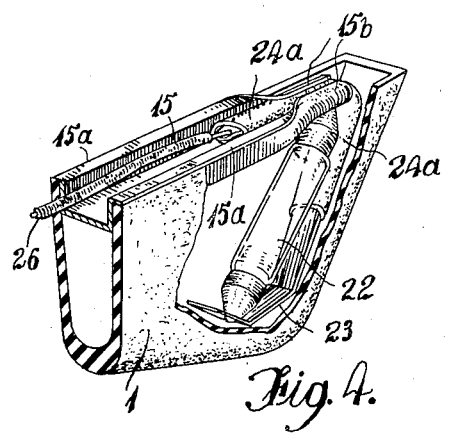
Figure 4 shows a fragmentary perspective view of the outer end of an arm according to a modification.
Figure 5:
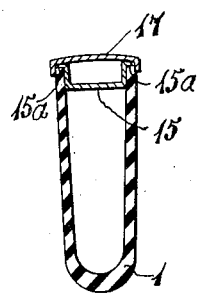
Figure 5 shows a section through the embodiment shown in Figure 4.

Figures 4 and 5 show details of another embodiment. In this form the reinforcing member 15 is again stamped from sheet metal but is additionally provided with outwardly extending flanges 15a which lie adjacent the upper edges of the hollow moulded arm and limit the distance by which it can extend into the hollow cavity of the arm. With this construction the horizontal ribs 16 shown in the embodiment illustrated in Figures 1 to 3 may be dispensed with. The open edge of the arm may be covered by a trimmer plate 17 in the same manner as described with reference to the previous embodiment.

Figure 4 shows an alternative method of securing the upper end of the strip 23 forming the lower contact for the lamp 22 to the end of the reinforcing member 15. In this form the upper end of the strip 23 is covered with a sheathing 24a of plastic material which is clamped between the inturned ends 15b of the reinforcing member.

Figure 6:
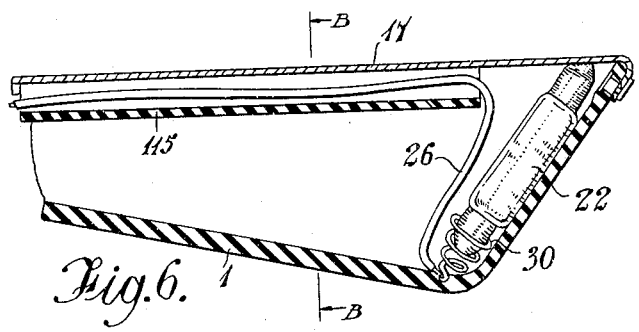
Figure 6 shows a side section through a part of another modification.
Figure 7:
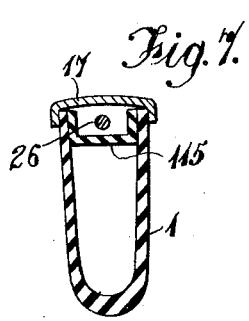
Figure 7 shows a section on the line B—B of Figure 6.

Figures 6 and 7 show another embodiment in which the reinforcing member 115 is moulded or extruded with a U-shaped or channel-shaped cross section of plastic material, preferably of the same as that from which the arm 1 is made. This reinforcing member is stuck or welded between the upper edges of the arm 1 such that the channel in the reinforcing member is directed upwards. The reinforcing member 115 preferably extends for a substantial distance along the open edge of the arm but is apertured or so arranged that an opening is left through which the illuminating lamp may be inserted into the arm. This may be effected as shown in Figure 7 by leaving a space between the outer end of the reinforcing member 115 and the outer end of the arm through which the lamp 22 may be inserted, the upper terminal of which engages with the metal trimmer plate 17, which is grounded in the manner above described, whilst the lower terminal of the lamp is fitted in a spring 30 which is connected to the wire 26 which passes along the channel within the reinforcing member. The spring 30 holds the upper terminal of the lamp firmly in contact with the underside of the trimmer plate 17.

Figure 8:
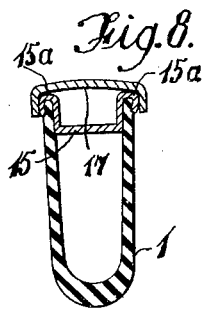
Figure 8 shows a section through a further modified arm construction.

Figure 8 shows a section through a further modification in which the reinforcing member 15 formed of sheet metal of channel-shaped cross section has the flange portions 15a made wider than shown in the embodiment of Figure 4, the extreme ends of the flanges being clamped or crimped over the free edges of the arm to secure the reinforcing member 15 permanently within the open edge thereof. A trimmer plate 17 may be fitted as in the previous embodiments to serve as a lead to one of the terminals of the illuminating lamp which may be mounted within the arm in the manner described with reference to Figure 6.

With the constructions described, the indicator arm although made of flexible plastic material which does not become cracked when struck or bent, is so reinforced that under normal conditions of use it does not bend out of its straight form and foul the casing or opening into which it fits when the arms are lowered. Under a heavy blow the arm flexes without cracking and whilst the reinforcing member, if made of metal, and the trimmer plate may be bent, the arm can be easily repaired by straightening these parts or substituting them by inexpensive replacement parts.

In order to reduce the possibility of the metal parts becoming bent if the arm should be bent a considerable distance out of its normal position, a feature of the invention consists in connecting the trimmer plate 17 to the metal bearing plate 3 in such a manner that it can swivel transversely with respect to the bearing plate. This is achieved with the embodiment illustrated in Figure 1 by connecting the trimmer plate to the bearing plate by means of a single screw 21, the side flanges of the trimmer plate 17 being removed adjacent the bearing plate whereby the trimmer plate can swing about the single screw without kinking. Due to the flexible nature of the plastic material from which the arm is made, the latter will not crack under this movement. If desired, spring means may be provided for restoring the arm to its normal position.

According to a further feature of the invention, the arm comprises a solid moulding of flexible plastic material, such as polythene, having a recess into which the illuminating lamp can be inserted. By not making the arm of hollow construction along its entire length, it may be made thinner and, if necessary, the material forming the recess may be moulded to form a cylindrical bulging portion into which the lamp is inserted. However, due to the flexible nature of the plastic, the arm may, if desired, be moulded completely flat on its external surfaces, the walls being thin where the recess is formed and stretching when the lamp is inserted therein. By using a small diameter lamp, however, the bulging may be negligible or not take place at all. However, a feature of the invention consists in constructing the bulb recess of such dimensions that the lamp bulb touches the inner surfaces at each side thereof and is held within the recess by the pressure of the flexible plastic thereagainst.

I claim:

1. A vehicle direction indicator comprising an arm moulded of translucent flexible plastic material having such elastic properties that it can flex when knocked without cracking, said arm being moulded with a cavity which is open along one edge of the arm, and means positioned within said cavity and extending longitudinally of said opening for maintaining the side walls of the cavity spaced apart.

2. A vehicle direction indicator comprising an arm moulded of a translucent flexible plastic material having such elastic properties that it can flex when knocked without cracking, said arm having a portion by which it can be secured to a bearing member and a chamber portion having opposed sides integrally joined along one longitudinal edge and open along the opposite longitudinal edge, and means for maintaining the side walls spaced apart along said open longitudinal edge.

3. A vehicle direction indicator comprising an arm moulded of a translucent flexible plastic material having such elastic properties that it can flex when knocked without cracking, said arm having a portion by which it can be secured to a bearing member and a chamber portion having opposed sides integrally joined along one longitudinal edge and open along the opposite longitudinal edge, means positioned between said side walls for maintaining them spaced apart along said open edge, a removable cover for the open edge of the arm, said cover having flanges which fit outside the outer surfaces of the arm, and means for attaching the cover to the arm.

4. A vehicle direction indicator comprising an arm moulded of a translucent flexible plastic material, said arm having a portion by which it can be secured to a bearing member and a chamber portion having opposed sides integrally joined along one longitudinal edge and open along the opposite longitudinal edge, a channel shaped reinforcing member fitting between the side walls at the open edge, means for limiting the distance by which the channel member can be inserted into the open edge of the arm, and a cover fitting over the open edge of the arm and having flanges along its opposite edges which fit over the edges of the outer surfaces of the side wall of the arm.

5. A vehicle direction indicator comprising an arm moulded of a translucent flexible plastic material, said arm having a portion by which it can be secured to a bearing member and a chamber portion having opposed sides integrally joined along one longitudinal edge and open along the opposite longitudinal edge, a channel shaped reinforcing member fitting between the side walls at the open edge, said channel shaped member having outwardly extending flanges at the outer edges of its side walls which bear against the edges of the side walls of the moulded arm, and a cover fitting over the open edge of the arm and retaining the reinforcing member in position.

6. For a vehicle direction indicator, an arm moulded of a translucent flexible plastic material, said arm having a portion by which it can be secured to a bearing member and a chamber portion having opposed sides integrally joined along one longitudinal edge and open along the opposite longitudinal edge, and a pair of ribs moulder integrally with and extending respectively opposite to each other along the internal surfaces of the side walls of the arm substantially parallel to and spaced from the edges thereof.

7. A vehicle direction indicator comprising an arm moulded of a translucent flexible plastic material having such elastic properties that it can flex when knocked without cracking, said arm having a shank portion and a chamber portion having opposed sides integrally joined along one longitudinal edge and open along the opposite longitudinal edge, a bearing member for the arm having a socket into which the shank portion fits, and a cover carried by said bearing member and fitting over the open edge of the arm and having flanges along its opposite edges which fit over the edges of the outer surfaces of the side walls of the arm.

8. A vehicle direction indicator comprising an arm moulded of a translucent flexible plastic material, said arm having a portion by which it can be secured to a bearing member and a chamber portion having opposed sides integrally joined along one longitudinal edge and open along the opposite longitudinal edge, a metal member fitting between the side walls at the open edge, a holder carried by said metal member for supporting an electric lamp between said side walls, said holder comprising a conducting member which forms one terminal for the lamp and is insulated from the metal member which forms the other terminal of the lamp, and a cover fitting over the open edge of the arm.

WILLIAM EDWARD O'SHEI.

REFERENCES CITED

The following references are of record in the file of this patent:

UNITED STATES PATENTS

| Number | Name | Date |
|---|---|---|
| 2,209,896 | Zimmermann | July 30, 1940 |
| 2,242,920 | O'Shei | May 20, 1941 |
| 2,254,916 | Schneider | Sept. 2, 1941 |